United States Patent [19]
Neal et al.

[11] 3,935,906
[45] Feb. 3, 1976

[54] ADJUSTABLE HEIGHT SOIL CONDITIONER WITH FRAME EXTENDING REARWARDLY FROM CULTIVATING IMPLEMENT

[75] Inventors: Archie E. Neal; Paul Moore, both of Garfield, Wash.

[73] Assignee: J. E. Love Company, Garfield, Wash.

[22] Filed: Sept. 20, 1974

[21] Appl. No.: 507,749

[52] U.S. Cl. .............. 172/177; 172/240; 172/547; 172/552; 172/643; 172/661; 172/700; 172/744
[51] Int. Cl.² A01B 49/02; A01B 63/22; A01B 63/26; A01B 65/06
[58] Field of Search ........... 172/31, 121, 151, 174, 172/175, 176, 177, 185, 187, 197, 198, 240, 429, 550, 551, 552, 613, 643, 661, 700, 708, 744, 763, 483, 547; 301/52

[56] References Cited
UNITED STATES PATENTS

| | | | |
|---|---|---|---|
| 357,842 | 2/1887 | Lubin | 172/151 |
| 772,529 | 10/1904 | McCain | 172/177 |
| 1,734,408 | 11/1929 | Thompson | 172/643 |
| 2,200,631 | 5/1940 | Merlich | 172/177 X |
| 2,574,468 | 11/1951 | Denton | 172/550 |
| 2,998,854 | 9/1961 | Morkoski | 172/240 X |
| 3,151,683 | 10/1964 | Steck | 172/177 X |
| 3,252,522 | 5/1966 | Taylor | 172/763 X |
| 3,393,753 | 7/1968 | Perkins | 172/700 |
| 3,692,120 | 9/1972 | Cline | 172/151 |

*Primary Examiner*—Richard J. Apley
*Assistant Examiner*—R. T. Stouffer
*Attorney, Agent, or Firm*—Wells, St. John & Roberts

[57] ABSTRACT

A soil conditioner for use in combination with a cultivating implement drawn behind a tractor to break up the soil and leave a prepared seedbed in a single operation. The conditioner is mounted to a framework extending rearwardly behind the cultivator. It comprises a set of reels each mounted to the framework for free rotation about a transverse axis. Two sets of axial blade members are provided about each reel. The blades are equiangularly spaced about the axis and are arranged so that each blade of one set is angularly spaced midway between adjacent blades of the other set. The first set of blades include ground-engaging edges spaced a first radius from the axis. The corresponding edges of the remaining set of blades are spaced a second radius from the axis that is less than the first radius. The different radii of the two sets of blades enable the conditioner to be towed through a field, with the freely-rotating blades breaking up clods of dirt left by the cultivator, without the blades becoming clogged with dirt. The conditioner also includes an adjustment structure for elevationally adjusting the blade edges relative to the cultivator. This adjustment structure includes adjustment brackets each connecting two portions of the soil conditioner frame. Each of these brackets is provided with a plurality of apertures. These apertures are selectively aligned with a set of corresponding apertures on one of the two portions of the soil conditioner frame. By placing bolts through the aligned apertures, the elevation of the blade edges is selectively adjusted.

3 Claims, 6 Drawing Figures

ADJUSTABLE HEIGHT SOIL CONDITIONER WITH FRAME EXTENDING REARWARDLY FROM CULTIVATING IMPLEMENT

BACKGROUND OF THE INVENTION

The present invention is related basically to farm implements for producing a finished or prepared seed bed after previous cultivating operations and more particularly to such implements utilized to prepare the seed bed simultaneously as the cultivating operation is taking place.

Present operations in preparing soil between spring crop or fall crop plantings involve the practice of loosening the ground with a disc harrow working at three to four inch depths. Following the discing operation, some other operation is performed to level the field and prepare it for planting. The problem with this operation is that the soil is tilled fairly shallow and is subject to erosion. If a chisel plow is utilized, the erosion problem can be substantially reduced. However, such chisel plows normally leave the ground with large clods of dirt that tend to seal off the surface and render it a difficult task to eventually work the rough soil into a prepared seed bed. Usually, several other steps are performed to bring the roughened soil into a prepared condition for planting. This process usually involves passing over the field several different times with different implements to break up the clods and level the soil for planting. If a substantial length of time passes between the initial cultivating operation and the final soil conditioning operation, the soil may dry or possibly become eroded, hampering the subsequent conditioning operations.

U.S. Pat. No. 2,200,631 to Merlich discloses a soil conditioner combined with a spring tooth harrow for loosening and preparing previously plowed ground for use as a seed bed. The device includes a reel rotatably mounted on a frame with axial blade members extending along the reel and spiraling partially about the reel axis. The blades are set to operate at a prescribed distance below the ground surface adjacent to a transverse knife carried below the blades. Therefore, as the apparatus is drawn along the ground, the reel rotates, bringing the blades into engagement with and penetrating the ground while moving past the relatively stationary knife to complete the soil conditioning operation. The edges of the blades are spaced at a fixed radius from the axis of the reel. We have found through experimentation that this arrangement tends to allow clogging of the adjacent blades with the compacted dirt. Further, the transverse knife that is carried below the blades increases the possibility of clogging.

U.S. Pat. No. 2,569,464 granted to Edwards et al. discloses an agricultural crust-busting implement. This implement is drawn behind a tractor in fields already having a crop growing therein. The implement also utilizes a spaced number of reels rotating about a transverse axis. The reels have ground-engaging axial blades thereon. These blades however, are also spaced at a fixed radius from the reel axis and will therefore become easily clogged with compacted dirt.

U.S. Pat. No. 3,692,120 to Cline discloses a tilling apparatus. This apparatus utilizes the combination of a chisel plow and a pulverizing reel behind the plow for breaking up clods created by the plow and a leveling blade mounted behind the pulverizing wheel for smoothing the soil surface. The Cline apparatus, like most of the above-cited arrangements, is comprised of a number of reels mounting a plurality of radially-extending blades thereon for rotation about a horizontal transverse axis. The blade edges are spaced a common fixed distance from the axis and will easily clog with hardened dirt clods tilled by the chisel plow.

It is the purpose of the present invention to provide a soil conditioning device in combination with a cultivating implement for efficiently producing a prepared seed bed behind the cultivator. This is accomplished by providing radial blades on a plurality of reels that are rotatable about a horizontal axis behind the cultivating implement. The blades are arranged on the reels in two sets, with each blade of one set being angularly located midway between adjacent blades of the other set. Both sets of blades include ground-engaging edges, with the edges of one set spaced at a first radius from the axis. The edges of the remaining set are spaced a second radius from the axis that is less than the first radius. With this arrangement, the condition will break up large dirt clods without becoming clogged with compacted soil between adjacent blades.

SUMMARY OF THE INVENTION

A soil conditioner is described in combination with a tractor-drawn cultivating implement, for following the implement along a selected path of travel and for conditioning and preparing a seed bed within the soil behind the implement. The conditioning device comprises a conditioner frame extending rearwardly from the cultivating implement with a reel rotatably mounted thereon for free rotation about an axis transverse to the path. A first set of blade members are mounted on the reel with elongated axial soil-engaging edges spaced from the axis by a first radius. A second set of blade members are also mounted on the reel. They are co-extensive in axial length with the first set and have elongated axial soil-engaging edges located at a second radius that is less than the first radius. The blades of the first and second sets are equiangularly arranged about the axis with each blade of one set being centered angularly between adjacent blades of the other set. Each blade further includes planar side surfaces extending radially inward from the edges toward the axis.

It is a first object of my invention to provide a soil conditioner that may be utilized in combination with a cultivator implement for tilling and producing a prepared seed bed in a single operation.

It is a further object to provide such a soil conditioner that may be selectively adjusted elevationally relative to the cultivator.

A yet further object is to provide such a soil conditioner that includes soil-engaging blade members spaced at different radii from a common rotational axis that will therefore not easily become compacted or clogged with dirt between adjacent blades.

It is a further object to provide such a device that is relatively simple in construction and therefore easy to maintain and operate.

These and other objects and advantages will become apparent upon reading the following disclosure which, taken with the accompanying drawings, discloses a preferred form of the present invention.

DETAILED DESCRIPTION OF A PREFERRED EMBODIMENT

Figure 1:
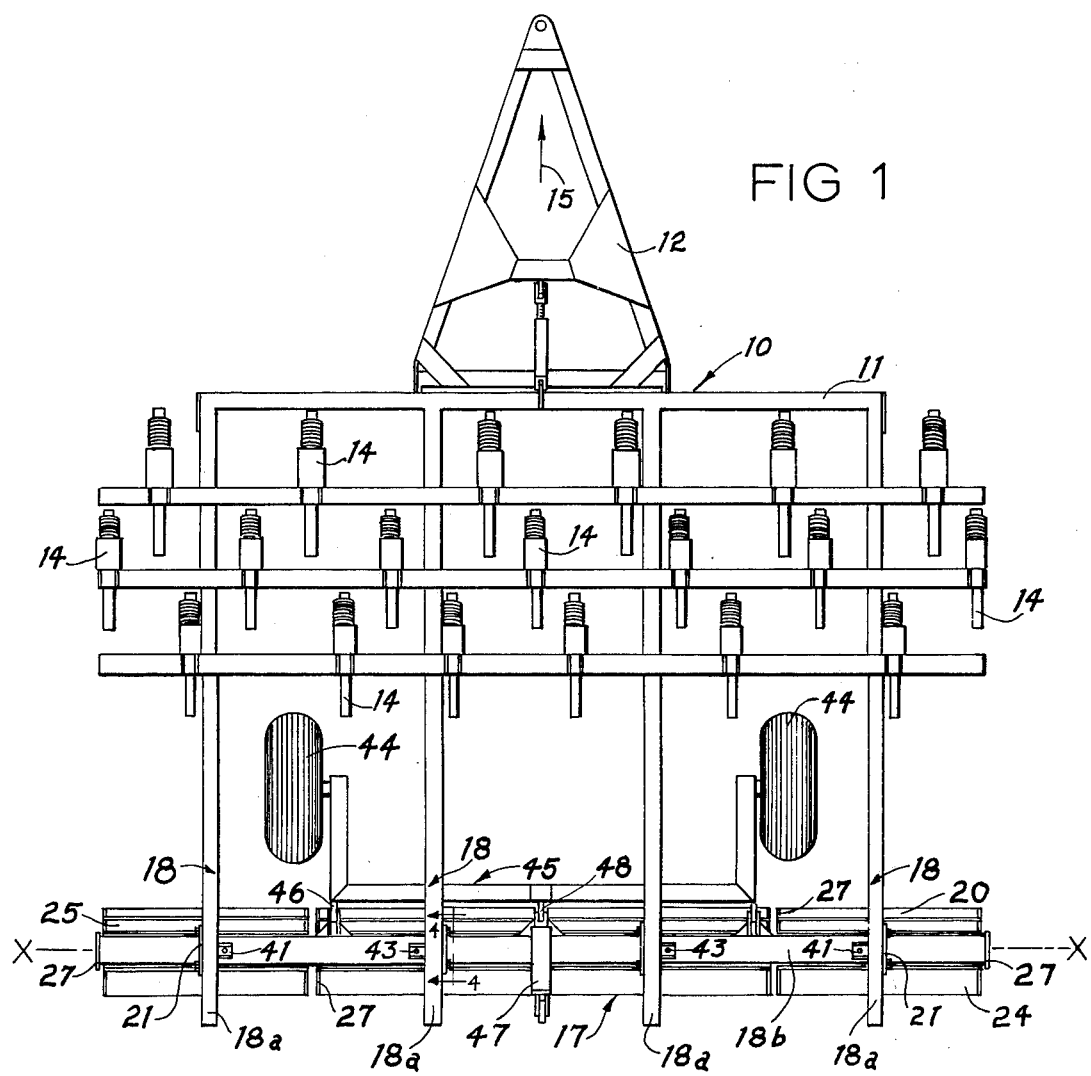
FIG. 1 is a plan view of the combination cultivator and soil conditioner.

The present invention is comprised of the combination of a soil conditioner and a cultivating implement drawn behind a tractor (not shown in the drawings) to cultivate soil and prepare a seed bed therein in a single operation. The cultivating implement is indicated generally in the drawings by the reference numeral 10. It may be comprised of a chisel plow, spring tooth harrow or disc harrow depending on the nature of the soil being worked and the discretion of the farmer using the equipment.

Figure 2:
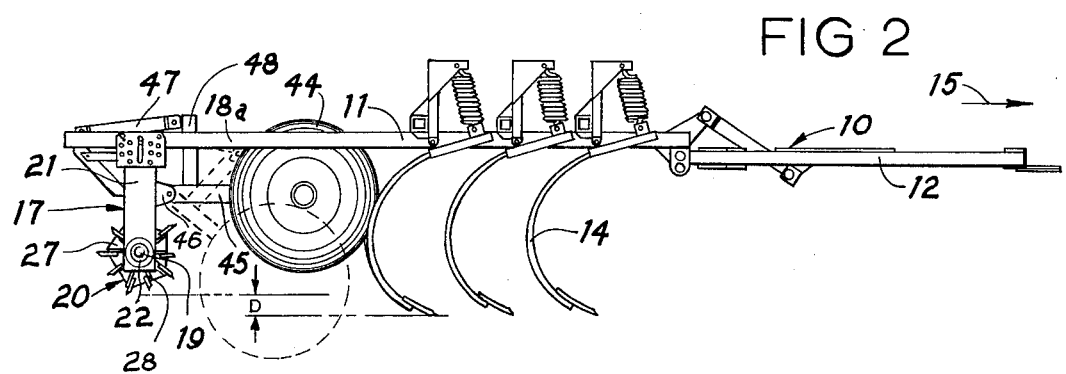
FIG. 2 is a side elevational view of the present invention.
Figure 3:
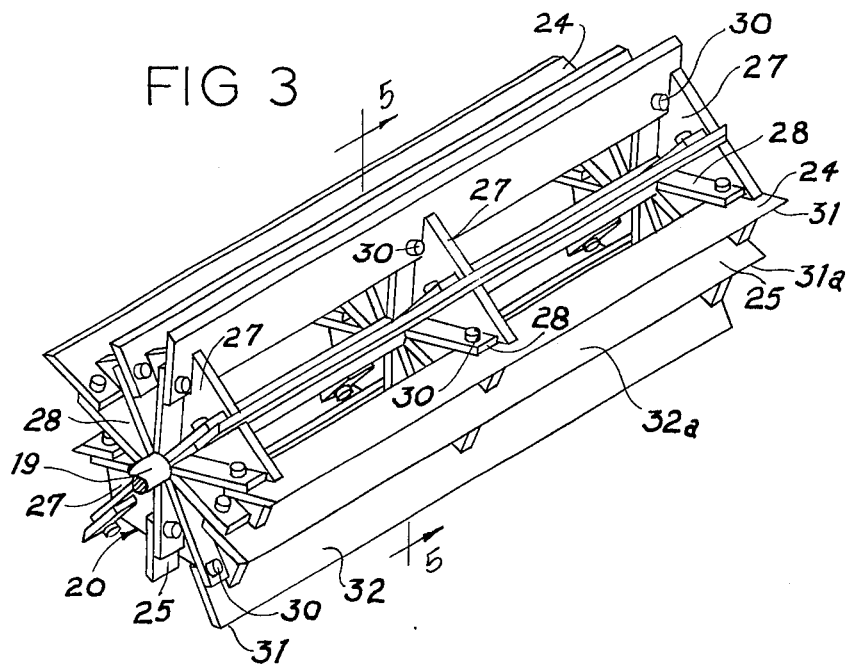
FIG. 3 is a fragmentary pictorial view of a single reel of the present invention.

Cultivating implement 10 includes a framework 11 having a drawbar 12 mounted thereon for attaching the implement to a tractor. The frame 11 mounts a series of spring teeth 14 that depend from frame 11 to engage and till soil at a specified depth. It is intended that the implement be drawn along a path as indicated by the reference arrows 15 (FIGS. 1 and 2).

The primary feature of the present invention is a soil conditioner 17 utilized in combination with cultivating implement 10 to prepare a final seed bed from the soil broken up by the spring tooth 14. The conditioner 10 includes a conditioner framework 18 extending rigidly rearward from the cultivator framework 11. As shown in the drawings, framework 18 is an integral portion of the cultivator framework 11.

Figure 4:
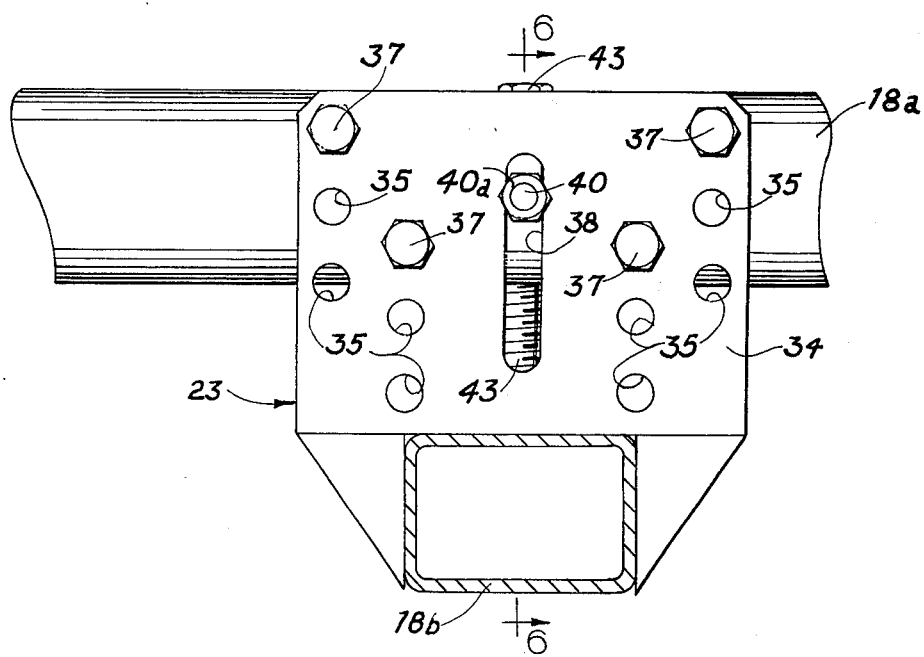
FIG. 4 is a sectional view taken along line 4—4 in FIG. 1.
Figure 6:
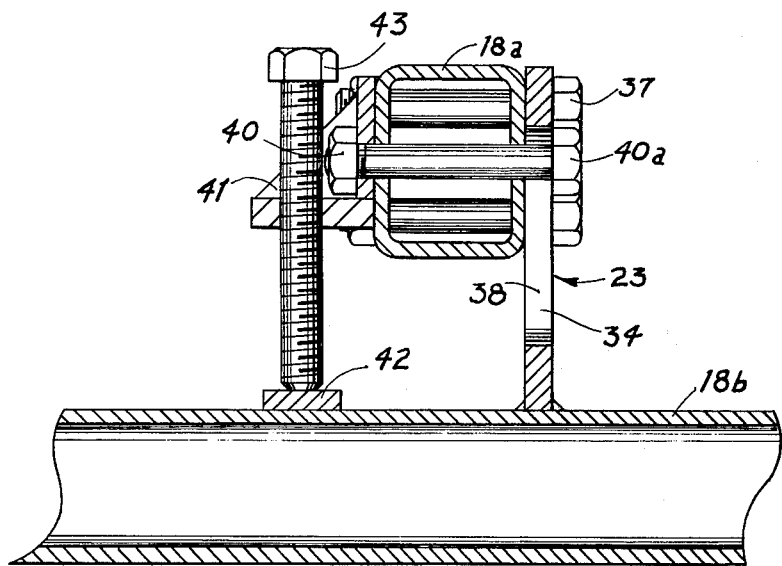
FIG. 6 is a sectional view taken along line 6—6 in FIG. 4.

The conditioner frame 18 is comprised of rearwardly projecting bars 18a that rotatably support a plurality of transverse reels 20. Reels 20 are pivotably mounted on end hangers 21 that are fixed to a transverse bar 18b of conditioner frame 18 (FIGS. 2, 4 and 6). Bar 18b is suspended from frame bars 18a by a number of adjusting brackets 34.

Hangers 21 provide suitable bearings 22 in which axles 19 of reels 20 are journalled. Bearings 22 define a horizontal axis X—X (FIG. 1) that is transverse to the path of the implement.

Reels 20 may be elevationally adjusted relative to the cultivating implement teeth 14 by an adjustment means 23 provided between bar 18b and conditioner frame 18. The adjusting means is manually operable to selectively raise or lower the reels independently of the operating depth of teeth 14. The adjustment means 23 will be described in greater detail below.

Each reel 20 is supplied with a plurality of blades that extend transverse to the path of travel. The blades are divided into sets, a first set 24 and second set 25. Both sets 24 and 25 are formed of elongated rectangular plates that are co-extensive axially along the axis X—X. The blades are mounted for rotation with the axles 19 by pentagonal support plates 27. Each support plate 27 is fixed on axle 19 perpendicular to the axis X—X. Plates 27 include two sets of radial brackets 28, 28a providing access by bolts 30 to hold the sets of blades 24 and 25 respectively, rigidly to plates 27.

Both sets of blades 24 and 25 include elongated outward edges 31, 31a respectively that are pointed to facilitate penetration of the rough soil tilled up by cultivating implement 10. Edges 31, 31a are parallel to axis X—X. It is conceivable, however, that edges 31, 31a could be arranged in a partial spiral orientation about axis X—X.

Figure 5:
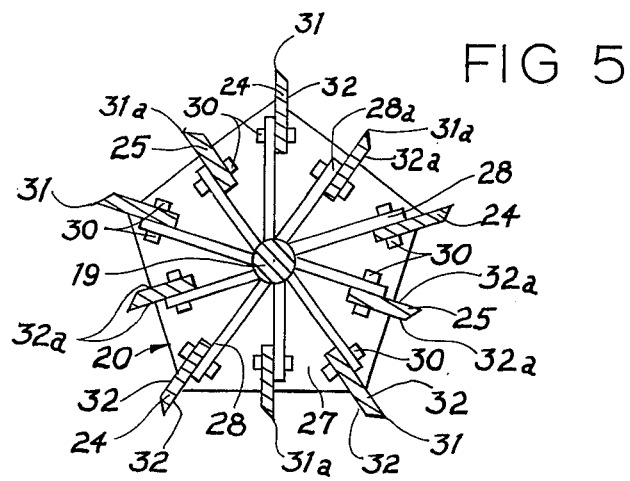
FIG. 5 is a sectional view taken along line 5—5 in FIG. 3.

It may be noted, especially in FIG. 5, that the blades 25 of the second set include edges 31a that are spaced by a radius from axis X—X that is substantially less than the radius from the axis to the edges 31 of the first set of blades 24. This consideration is an important feature of the present invention in that it enables continuous use of conditioner 10 without the adjacent blades becoming clogged with compacted dirt. This problem is prevalent in such apparatus wherein the edges are located at a single fixed radius from the rotating axis. The arrangement of the two sets of blades as shown in FIG. 5 is such that each blade of the second set 25 is located angularly midway between the adjacent blades of the first set 24. Both sets 24 and 25 are equiangularly positioned about the axis X—X.

Blades 24 and 25 each include planar sides 32, 32a respectively, that are parallel and arranged substantially radially with respect to axis X—X. The radial arrangement of sides 32, 32a provides a gap between adjacent blades to allow free passage of dirt therebetween. This is another feature that assists to prevent clogging of the areas between adjacent sides with compacted dirt.

Looking now at the adjustment means 23 in greater detail, reference will be made to FIGS. 4 and 6 in particular. The adjustment means 23 is partially comprised of adjusting brackets 34 mounted on one side of rearwardly-extending bars 18a and fixed to transverse support bar 18b of conditioner frame 18. The brackets are mounted to frame 18 by means of bolts 37 extending through brackets 34 and into frame bar 18a. Each adjustment bracket 34 is provided with four such bolts 37. Brackets 34 are also provided with a number of vertically aligned adjustment holes 35. When bolts 37 are disengaged from the frame and brackets, the brackets, along with bar 18b and reels 20, may be vertically moved relative to the frame to align a desired set of holes 35 with complementary holes in the frame bars 18a.

Movement of adjusting bracket 34 is accomplished by an adjusting mechanism comprised of a clamp bolt 40 and nut 40a, a bracket 41, and an adjustment bolt 43 (FIG. 6). Clamp bolts 40 extend through adjusting brackets 34 within vertical slots 38 therein. The bolts 40 also extend through appropriate apetures in the frame bars 18a and through upright portions of brackets 41. Thus, when bolts 40 and nuts 40a are tightened, the bars 18a are clamped tightly between the brackets 41 and adjusting brackets 34 to prevent their vertical movement relative to the nut 40a and bolt 40.

Adjusting bolts 43 extend vertically through bracket 41 and downwardly to pads 42 on transverse support bar 18b of the conditioner framework 18. Bolts 43 are threadably engaged within brackets 41 through a threaded aperture therein. In order to adjust the operational height of blades 24 and 25, the operator first lowers the reels into ground contact for weight support. He then simply removes bolts 37, loosens the nut of the nuts 40a on bolts 40 and raises or lowers frame 18 relative to the reels until a desired set of holes 35 are aligned with the complementary holes in frame bars 18a. He may then replace bolts 37 to secure the brackets 34 to the framework 18. After doing this he may again retighten nuts 40a on bolts 40, clamping the plate to the frame member.

A wheel and wheel frame assembly is also provided to enable transportation of the apparatus on roadways or for lifting or lowering the ground-engaging elements thereof, relative to the support surface. The wheels 44 provided are rotatably mounted about horizontal axes on a wheel frame 45. The wheel frame 45 is pivoted at 46 to be selectively moved between an inoperative and operative position as shown in FIG. 2 by solid and dashed lines respectively. Pivotal movement of wheels 44 and wheel frame 45 is accomplished by a drive cylinder 47. Cylinder 47 is mounted between the framework 18 and a bracket 48 that extends rigidly from wheel frame 45. Extension of cylinder 47 forcibly pivots the wheel frame 45 and wheels 44 downwardly as shown by dashed lines in FIG. 2. Retraction of the cylinder ram serves to pivot the wheels upwardly away from engagement with the ground supporting surface and allow the soil-engaging elements of the implement to penetrate the ground.

In operation, we have found that it is preferable to adjust the operational cutting depth of the blade sets 24 and 25 relative to the teeth 14 of cultivating implement 10 so that there is a depth difference of approximately 5 to 6 inches with the blades 24 and 25 operating at a higher elevation than teeth 14. This distance is indicated by the reference character D in FIG. 2. The adjusting feature of the present invention however allows this dimension to be selectively changed to accommodate various soil conditions and ground conditioning operations.

When in operation, teeth 14 move through the ground and turn up relatively large clods of dirt. The reels 20 roll along frictionally behind teeth 14 so the blades 24 and 25 operate to penetrate and break up the clods produced by spring teeth 14. Blades 24 and 25 operate to pulverize the clods of soil and produce a finished prepared seed bed that is then ready for planting. This single operation prevents or eliminates the need for going back over the field after harrowing to condition the soil and prepare a suitable seed bed.

It may have become obvious from the above description and accompanying drawings that various changes and modifications may be made therein without departing from the intended scope of my invention. Therefore, only the following claims are to be taken as definitions of this invention.

What we claim is:

1. In combination with a tractor-driven cultivating implement, a soil conditioner for following the implement along a selected path of travel to condition the soil by breaking clods and prepare a seed bed within the soil behind the implement, said soil conditioner comprising:
   a conditioner support frame extending rearwardly from said cultivating implement;
   a transverse support bar extending transversly of said rearwardly extending support frame and supported thereby rearwardly of said cultivating implement;
   an upright adjustable hanger member fixed to the transverse support bar and adjustably connected to the conditioner support frame for providing adjustable height support of said support bar relative to said support frame;
   end hangers depending from the support bar;
   a reel rotatably mounted on the end hangers and spaced from said support bar for free rotation about an axis transverse to said path;
   adjusting means providing the adjustable connection between the upright adjustable hanger member and conditioner support frame comprising: a plurality of vertically spaced apertures formed through the hanger member with corresponding apertures formed through the conditioner support frame;
   mounting nut and bolt assemblies extending through appropriate ones of said spaced apertures in the hanger member and aligned ones of said corresponding apertures in the support frame; and
   upright adjusting bolt means operatively engaging the conditioner support frame and abutting the transverse support bar for raising and lowering the frame relative to the suport bar to bring selected ones of said spaced apertures of the hanger member into alignment with complementary one of said corresponding apertures in the conditioner support frame;
   a first set of blade members mounted on said reel, having elongated axial soil-engaging edges parallel to said axis and spaced therefrom by a first radius;
   a second set of blade members mounted on said reel having elongated axial soil-engaging edges parallel to said axis and spaced therefrom by a second radius that is less than the first radius;
   wherein the blade members of the first and second sets are arranged equiangularly about the axis in alternating sequence with each blade member of the first set being centered angularly between a pair of adjacent ones of said blade members of the second set; and
   planar side surfaces on each blade of both sets extending radially inwardly from said edge toward said axis.

2. The combination set out by claim 1 wherein said cultivating implement is a spring tooth harrow, including a rigid harrow framework and wherein said conditioner support frame is a rigid rearward extension of said harrow framework.

3. The combination set out in claim 2 further comprising:
   a retractable wheel frame movably mounted to the conditioner support frame;
   a pair of wheels mounted to the retractable wheel frame for free rotation about a common axis transverse to said path; and
   means connecting the wheel frame to said conditioner support frame for selectively lowering the wheels into engagement with the ground and raising the harrow and both sets of blades above the ground surface for transporting purposes.

* * * * *